United States Patent [19]

Worley, Jr. et al.

[11] Patent Number: 4,713,755
[45] Date of Patent: Dec. 15, 1987

[54] CACHE MEMORY CONSISTENCY CONTROL WITH EXPLICIT SOFTWARE INSTRUCTIONS

[75] Inventors: W. S. Worley, Jr.; William R. Bryg, both of Saratoga; Allen Baum, Palo Alto, all of Calif.

[73] Assignee: Hewlett-Packard Company, Palo Alto, Calif.

[21] Appl. No.: 750,381

[22] Filed: Jun. 28, 1985

[51] Int. Cl.$^4$ .............................................. G06F 12/08
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,771,137 | 11/1973 | Barner et al. | 364/200 |
| 3,845,474 | 10/1974 | Lange et al. | 364/200 |
| 4,156,906 | 5/1979 | Ryan | 364/200 |

FOREIGN PATENT DOCUMENTS

| | | |
|---|---|---|
| 0052370 | 5/1982 | European Pat. Off. . |
| 0145594 | 6/1985 | European Pat. Off. . |

OTHER PUBLICATIONS

IBM Technical Disclosure Bulletin, "Technique for Improved Channel Performance", by J. F. Court and K. L. Leiner, vol. 24, No. 7A, Dec. 1981, pp. 3128-3129.

IBM Technical Disclosure Bulletin, "Vary Storage Physical On/Off Line in a Non-Store-Through Cache System" by B. B. Moore et al, vol. 23, No. 7B, Dec. 1980, p. 3329.

The 11th Annual International Symposium on Computer Architecture, Jun. 5-7, 1984, Ann Arbor, Michigan, "A Low-Overhead Coherence Solution for Multiprocessors with Private Cache Memories", Mark S. Papamarcos and Janak H. Patel, pp. 348-354.

*Primary Examiner*—Raulfe B. Zache
*Attorney, Agent, or Firm*—James M. Williams

[57] ABSTRACT

Memory integrity is maintained in a system with a hierarchical memory using a set of explicit cache control instructions. The caches in the system have two status flags, a valid bit and a dirty bit, with each block of information stored. The operating system executes selected cache control instructions to ensure memory integrity whenever there is a possibility that integrity could be compromised.

5 Claims, 3 Drawing Figures

| | 31 | 33 | 35 | 37 | 39 |
|---|---|---|---|---|---|
| 1 | | DATA | PHYSICAL TAG | V | D |
| 2 | | | | | |
| 3 | | | | | |
| 4 | | | | | |
| . | | . | . | . | . |
| . | | . | . | . | . |
| . | | . | . | . | . |
| n-1 | | | | | |
| n | | | | | |

FIG 2

CACHE MEMORY CONSISTENCY CONTROL WITH EXPLICIT SOFTWARE INSTRUCTIONS

BACKGROUND AND SUMMARY OF THE INVENTION

Most modern computer systems include a central processing unit (CPU) and a main memory. The speed at which the CPU can decode and execute instructions to process data has for some time exceeded the speed at which instructions and operands can be transferred from main memory to the CPU. In an attempt to reduce the problems caused by this mismatch, many computers include a cache memory or buffer between the CPU and main memory.

Cache memories are small, high-speed buffer memories used to hold temporarily those portions of the contents of main memory which are believed to be currently in use by the CPU. The main purpose of caches is to shorten the time necessary to perform memory accesses, either for data or instruction fetch. Information located in cache memory may be accessed in much less time than that located in main memory. Thus, a CPU with a cache memory needs to spend far less time waiting for instructions and operands to be fetched and/or stored. For such machines the cache memory produces a very substantial increase in execution speed.

A cache is made up of many blocks of one or more words of data, each of which is associated with an address tag that uniquely identifies which block of main memory it is a copy of. Each time the processor makes a memory reference, the cache checks to see if it has a copy of the requested data. If it does, it supplies the data; otherwise, it gets the block from main memory, replacing one of the blocks stored in the cache, then supplies the data to the processor. See, Smith, A. J., Cache Memories, ACM Computing Surveys, 14:3 (Sept. 1982), pp. 473-530.

Optimizing the design of a cache memory generally has four aspects:

(1) Maximizing the probability of finding a memory reference's target in the cache (the hit ratio), (2) minimizing the time to access information that is indeed in the cache (access time), (3) minimizing the delay due to a miss, and (4) minimizing the overheads of updating main memory and maintaining multicache consistency.

All of these objectives are to be accomplished under suitable cost constraints and in view of the inter-relationship between the parameters.

When the CPU executes instructions that modify the contents of the current address space, those changes must eventually be reflected in main memory; the cache is only a temporary buffer. There are two general approaches to updating main memory: stores can be transmitted directly to main memory (referred to as write-through or store-through), or stores can initially modify the data stored in the cache, and can later be reflected in main memory (copy-back or write-to). The choice between write-through and copy-back strategies also has implications in the choice of a method for maintaining consistency among the multiple cache memories in a tightly coupled multiprocessor system.

A major disadvantage to the write-through approach is that write-through requires a main memory access on every store. This adds significantly to the relatively slow main memory traffic load which slows the execution rate of the processor and which the cache is intended to minimize. However, when write-through is not used, the problem of cache consistency arises because main memory does not always contain an up-to-date copy of all the information in the system.

Input and output between the main memory and peripheral devices is an additional source of references to the information in main memory which must be harmonized with the operation of cache memories. It is important that an output request stream reference the most current values for the information transferred. Similarly, it is also important that input data be immediately reflected in any and all copies of those lines in memory.

There have been several approaches to solving this problem. One is to direct the I/O stream through the cache itself. This method is limited to single processor systems. Further, it interferes significantly with the processor's use of the cache, both by keeping the cache busy when the processor needs it and by displacing blocks of information currently being used by the processor with the blocks from the I/O stream. Thus it degrades both the cache access time and the hit rate. An alternate approach is to use a write-through policy and broadcast all writes so as to update or invalidate the target line wherever found. Although this method accesses main memory instead of the cache, it suffers from the disadvantages of the write-through strategy discussed above. In addition, this hardware intensive solution is expensive to implement and increases the cache access cycle time by requiring the cache to check for invalidation. This is particularly disadvantageous in multiprocessor systems because every cache memory in the system can be forced to surrender a cycle to invalidation lookup whenever any processor in the system performs a store.

Another alternative is to implement a directory to keep track of the location and status of all copies of each block of data. The directory can be centralized in main memory or distributed among the caches, I/O channels and main memory. This system insures that at any time only one processor or I/O channel is capable of modifying any block of data. See, Tang, C. K., Cache Design in the Tightly Coupled Multiprocessor System, AFPIS Proc., N.C.C., vol. 45, pp. 749-53 (1976). The major disadvantage of the directory control system is the complexity and expense of the additional hardware it requires.

Finally, if a processor fails, for instance because of a power interruption, the memory system must assure that the most current copies of information are stored in main memory, so that recovery can be more easily accomplished.

It is an object of this invention to provide a system for maintaining the memory integrity and consistency in a computer system having cache memories, placing the burden of maintaining integrity on the software, thus allowing the hardware to remain relatively simple, cheap and fast.

It is also an object of this invention to minimize the impact of the overhead for maintaining memory integrity and consistency on the operation of the cache memories, so that the cache access time and miss ratio can be minimized.

These and other objects of the invention are accomplished in a computer having an instruction set including explicit instructions for controlling the invalidation or removal of blocks of data in the cache memories.

Each block of data stored in the caches has two one-bit status flags, a valid bit to indicate whether the block contains up-to-date information, and a dirty bit to indicate whether the data in the block has been stored to by the processor since it entered the cache. The instruction set includes instructions for removing a block with a particular address from the cache and writing it back to memory if necessary, for removing a block without writeback to main memory, for suspending execution of instructions until pending cache control operations are completed, and for efficiently removing and writing back to main memory all "dirty" blocks in the cache in case of a processor failure. The operating system software invokes these instructions in situations which could result in inconsistent or stale data in the cache memories.

BRIEF DESCRIPTION OF THE DRAWINGS

FIG. 2 is a schematic illustration of a cache memory constructed in accordance with the invention.

DETAILED DESCRIPTION OF THE INVENTION

Figure 1:
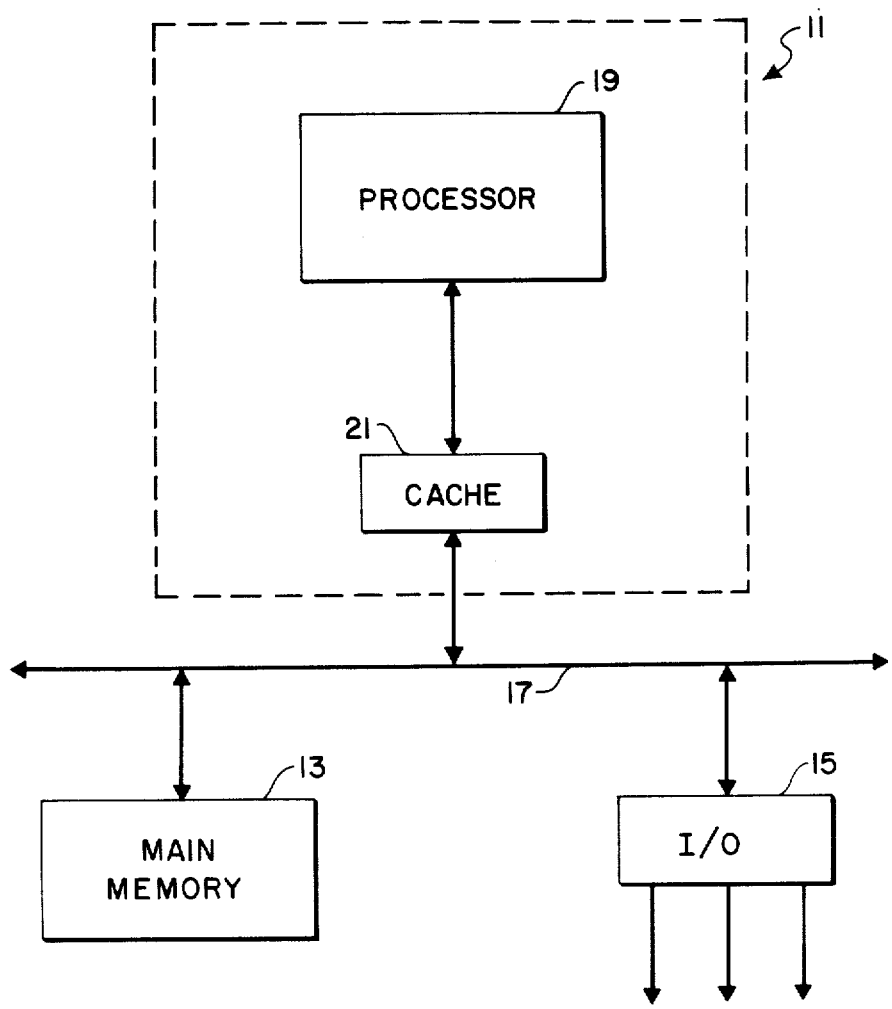
FIG. 1 is a schematic block diagram of a computer system which incorporates the invention.

A computer system which operates according to the invention is schematically illustrated in FIG. 1. The main processor 11, often referred to as the CPU, communicates with main memory 13 and input/output channel 15 via memory bus 17. The main processor includes a processor 19 which fetches, decodes and executes instructions to process data. Data and instructions are stored in main memory 13, transferred to processor 19 when they are requested during the execution of a program or routine and returned to main memory 13 after the program or routine has been completed.

Access to main memory 13 is relatively slow compared with the operation of processor 19. If processor 19 had to wait for main memory access to be completed each time an instruction or data was needed, its execution rate would be reduced significantly. In order to provide access times which more closely match the needs of the processor, cache 21, which may be referred to as a buffer memory, stores a limited number of instructions and data. Since cache 21 is much smaller than main memory 13 it can be economically built to have higher access rates.

The operating system software for the computer, rather than the hardware of the component units, is responsible for maintaining the integrity and consistency of the memory. In order to accomplish this, the operating system invokes explicit control instructions included in the computer's instruction set.

Figure 2:
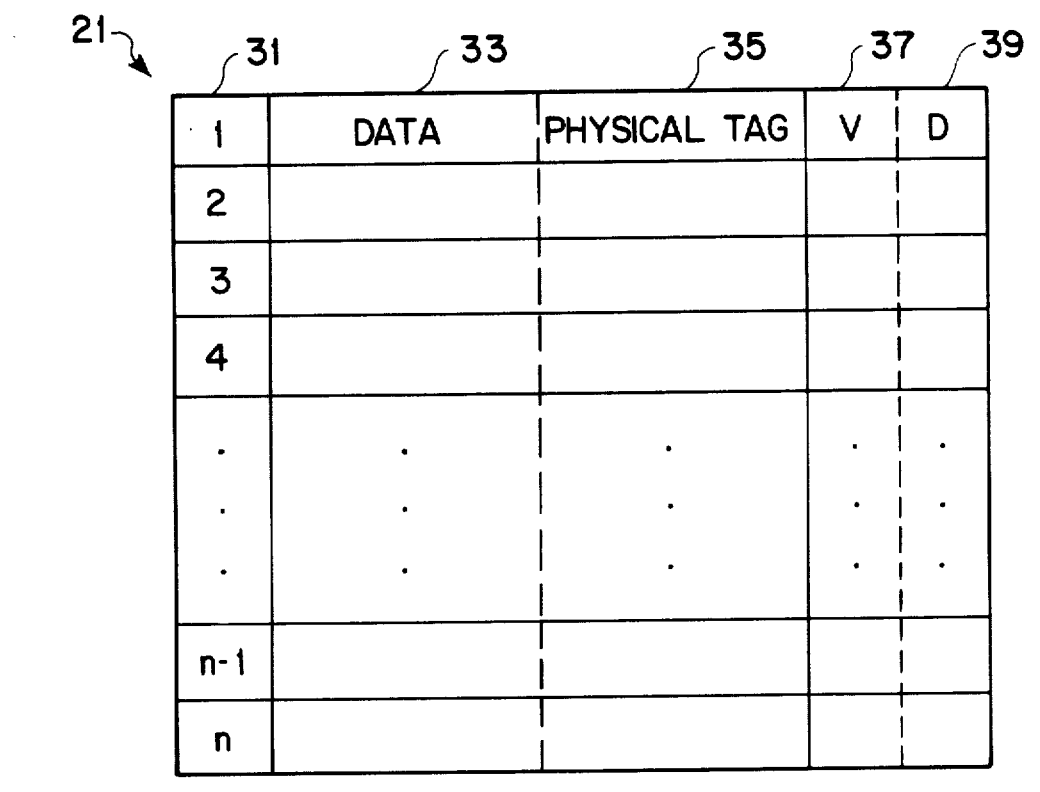

To explain the system of the invention more completely, an understanding of the structure of cache memory 21 is necessary. The entries of the array in cache memory 21 are illustrated in FIG. 2. Cache 21 comprises an array of locations labeled with an index 31 which store data 33 and a physical page tag 35 which corresponds to the physical page number of the location of the copy of the data in main memory.

In addition to the data 33 and tags 35 stored in the cache, each block has associated with it two one-bit status flags, "valid" and "dirty". The valid bit 37 is set if and only if that block has valid data, i.e., up-to-date data.

The dirty bit 39 is set if the processor has stored to the address since it has been brought into the cache. Unless cache 21 updates main memory 13 every time processor 19 does a store (write-through), the cache has more up-to-date data for a block than main memory has. Dirty bit 39 serves to indicate that main memory 13 must be updated by writing the data in the block in cache 21 back to main memory 13 when the block is swapped out of the cache.

Figure 3:
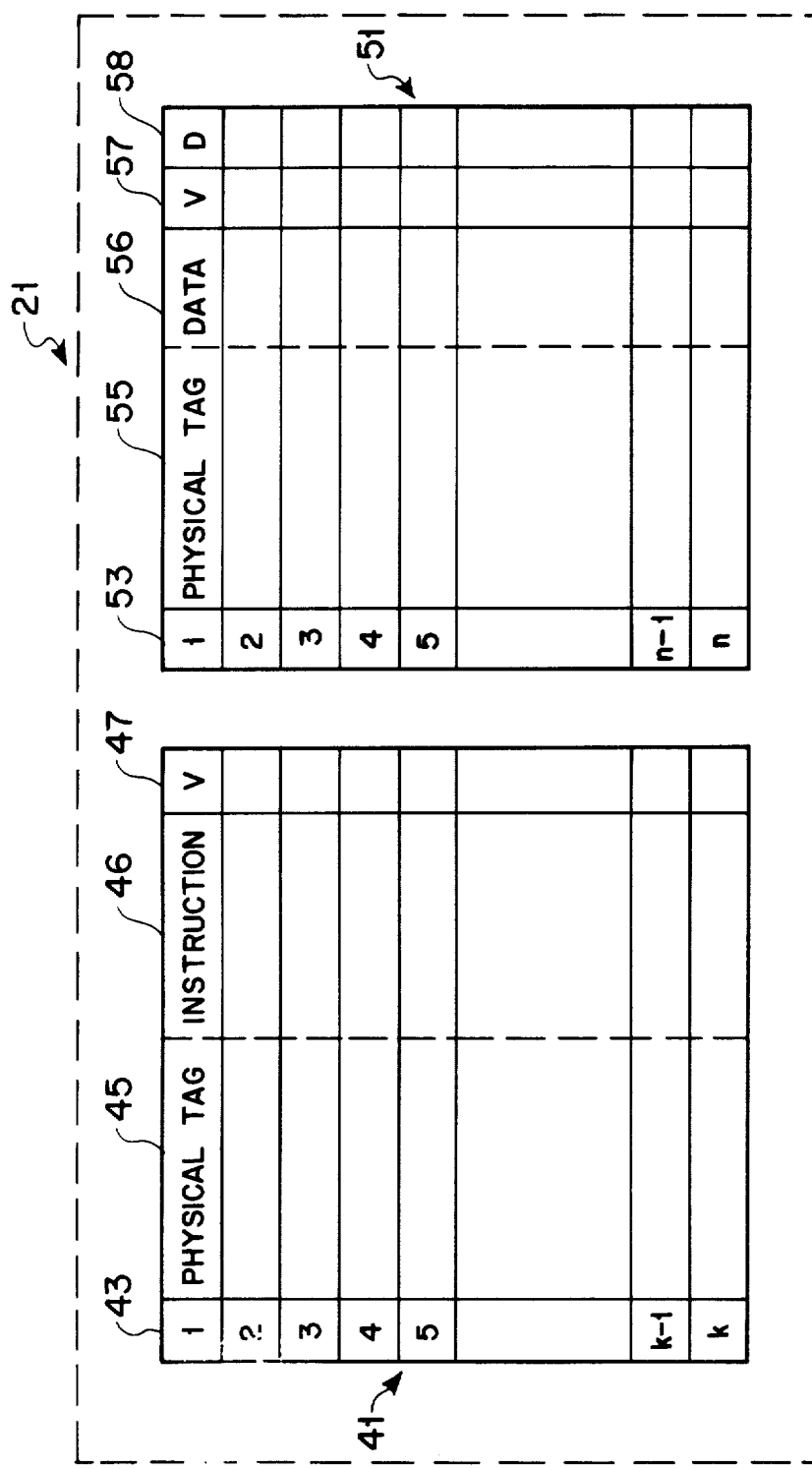
FIG. 3 is a schematic illustration of an alternative form of cache memory constructed in accordance with the invention.

Cache 21 can also be divided into two sections, one for data and another for instructions, as illustrated in FIG. 3. For many computer architectures, this split cache provides performance advantages. Both the instruction cache 41 and the data cache 51 have structures similar to that of the unified cache described above. Instruction cache 41 has an array of locations labeled with an index 43. Each location stores an entry comprising: a physical page tag 45, an instruction 46 and a valid bit 47. Data cache 51 has an array of locations labelled with an index 53. Each location stores an entry comprising: a physical tag 55, a block of data 56, a valid bit 57 and a dirty bit 58. Although this cache organization provides certain advantages, it also requires additional control instructions. In particular, instructions may be modified and copies may then appear in both sections of the cache. The operating system must therefore flush blocks from the instruction cache 41 and from data cache 51 back to main memory 13 to insure consistency.

The operating system performs the required memory maintenance functions using six instructions: Flush Data Cache, Purge Data Cache, Flush Instruction Cache, Flush Data Cache Entry, Flush Instruction Cache Entry and Synchronize Caches.

The Flush Data Cache (FDC) instruction sets the addressed data cache valid bit to "invalid" if the data address hits the data cache. The block of data at the given address is removed from the cache and written back to the main memory if the dirty bit is set.

The Purge Data Cache (PDC) instruction sets the addressed data cache valid bit to "invalid" if the data address hits the cache. The block of data at the given address is removed from the cache and no write-back is performed.

The Flush Instruction Cache (FIC) instruction sets the addressed instruction cache valid bit to "invalid" if the address hits the cache. The instruction at the given address is removed from the cache.

The Flush Data Cache Entry (FDCE) instruction is a special kind of flush that can be used in a routine to flush the entire cache, for example in the event of a processor failure. This routine is implementation dependent. For a multiple-set cache, the routine steps through the index range of the cache once for each set. The FDCE instruction flushes a block of data and sets the addressed data cache valid bit to "invalid" whether or not there is a hit at the cache index. That is, the block is written back to main memory if and only if it is valid and dirty, without comparing the cache tag to any requested address.

The Flush Instruction Cache Entry (FICE) instruction accomplishes the same function in the instruction cache as the FDCE instruction accomplishes in the data cache.

The Synchronize Caches (SYNC) instruction suspends instruction execution by the processor until the completion of all instruction cache and data cache operations. This guarantees that any reference to data will await the completion of the cache operations required to ensure the integrity of that data.

The operation of the system is illustrated by the following examples. The operating system controls access to main memory by the processor and by the peripheral devices attached to I/O channel 15.

When data is to be read into main memory 13 from an external device through I/O channel 15, the operating system must insure that the addresses into which or from which the data is transferred do not overlap areas mapped into either data or instruction caches. In order to clear any stale data out of the caches, before the I/O is performed, the system broadcasts to each cache the FDC and FIC instruction over the range of addresses into which the input data is to be mapped.

When data is to be read out of main memory to an external device through I/O channel 15, the operating system must insure that the addresses from which the data is transferred do not overlap areas mapped into data caches, so that the most up-to-date data is transferred. In order to update main memory with the data in the caches that has been modified by the processors, the system broadcasts to each cache the FDC instruction for the range of addresses from which the output data is to be read. The FDC instruction causes the cache to write any dirty blocks back to main memory.

In a virtual memory system, whenever a page or segment is moved from main memory 13 to a peripheral memory (eg., a disc memory) connected to I/O channel 15, the data from the page or segment must be flushed from all caches. The operating system broadcasts to the caches the FDC and FIC instruction over the range of addresses included in the page or segment. When a page or segment is destroyed, for example because of program termination, the data must be removed from the cache but need not be stored. In this instance, the operating system uses the PDC and FIC instructions. No flush or purge operations are needed when a page or segment is created or brought in from a peripheral memory because the addresses into which it is mapped will have just been flushed or purged during the removal of the previous page or segment to make room for the new page or segment.

In order to accommodate programs with self-modifying code, the operating system must remove from the caches any stale copies of the modified instruction to guarantee that only the new version of the instruction will be executed. After the modification of the instruction has been done in data cache 51, the operating system uses the FDC instruction to force the modified copy out to main memory, uses the FIC instruction to remove any stale copy of the instruction from instruction cache 41, then executes the SYNC instruction to insure that the modified instruction is not invoked until the FDC and FIC instructions have been completed.

In the event of a processor failure, for example caused by a power failure, the modified blocks of data residing in the caches must be written back to main memory. The operating system can accomplish this in a minimal amount of time with the FDCE and FICE instructions. A routine using the FDCE and FICE instructions flushes the caches quickly because by stepping through the index range of the caches rather than using the address space which is much larger. As the routine steps through the caches, only the blocks that are valid and dirty are written back to main memory 13.

We claim:

1. A computer system having a multi-level memory hierarchy and means for maintaining the integrity of blocks of information stored at different levels in the hierarchy, comprising:
   a processor for executing instructions and processing data, said processor executing a set of instructions for providing explicit control of the transfer of blocks of data between levels of the memory hierarchy;
   memory for storing instructions and data;
   an I/O channel connected to the memory for transferring data and instructions into and out of the memory;
   a cache connected between the processor and the memory for storing selected blocks of information from the memory for use by the processor, and having associated with each stored block a valid status flag and a dirty status flag; and
   an operating system resident in memory and accessible by the processor, containing the instructions in the instruction set, for causing the execution of certain of the instructions from the instruction set to ensure the consistency of the information stored in the cache with the information transferred into and out of memory.

2. The computer system of claim 1 wherein,
   the instruction set comprises Flush Data Cache, Purge Data Cache, Flush Instruction Cache, Flush Data Cache Entry, Flush Instruction Cache Entry and Synchronize Caches instructions; and
   prior to transfer of data or instructions into or out of memory via the I/O channel, the operating system broadcasts the Flush Data Cache and Flush Instruction Cache instructions to the cache over the range of addresses into which or out of which data is transferred.

3. The computer system of claim 2 wherein the multi-level memory hierarchy is implemented as a virtual memory system including main memory and peripheral memory and, when a page or a segment is removed from main memory to a peripheral memory, the operating system broadcasts the Flush Data Cache and Flush Instruction Cache instructions to the cache over the range of addresses in the page or segment;
   when a page or segment is destroyed, the operating system broadcasts the Purge Data Cache and Flush Instruction Cache instructions to the cache over the range of addresses in the page or segment.

4. The computer system of claim 2 wherein,
   the cache is divided into two segments, a data cache for storing data and an instruction cache for storing instructions;
   instructions can be modified when stored as part of a block of data in the data cache; and
   after modification of an instruction, the operating system issues the Flush Data Cache instruction to the data cache for the address of the block including the modified instruction, issues the Flush Instruction Cache instruction to the instruction cache for the address of the modified instruction and then executes the Synchronize Caches instruction.

5. The computer system of claim 2 wherein, in the event of a processor failure, the operating system executes a routine including the Flush Data Cache Entry and Flush Instruction Cache Entry instructions over the index range for the data cache and for the instruction cache.

* * * * *